(12) United States Patent
Chakrabarti

(10) Patent No.: US 6,646,623 B1
(45) Date of Patent: *Nov. 11, 2003

(54) THREE-DIMENSIONAL DISPLAY APPARATUS

(75) Inventor: Swapan Chakrabarti, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 356 days.

This patent is subject to a terminal disclaimer.

(21) Appl. No.: 09/586,695

(22) Filed: Jun. 1, 2000

Related U.S. Application Data

(60) Provisional application No. 60/136,834, filed on Jun. 1, 1999.

(51) Int. Cl.$^7$ .................................................. G09G 5/00
(52) U.S. Cl. ........................................... 345/6; 345/5
(58) Field of Search ......................... 345/5–10, 139, 345/151, 207; 348/36–40, 42, 46, 51; 359/462

(56) References Cited

U.S. PATENT DOCUMENTS

| | | | |
|---|---|---|---|
| 2,810,318 A | 10/1957 | Dockhorn | |
| 3,079,959 A | 3/1963 | Johnston | |
| 3,154,636 A | 10/1964 | Schwertz | |
| 3,555,349 A | 1/1971 | Munz .......................... | 315/21 |
| 3,891,305 A | 6/1975 | Fader ......................... | 350/144 |
| 3,970,361 A | 7/1976 | Di Matteo et al. .......... | 356/144 |
| 4,472,737 A | 9/1984 | Iwasaki ....................... | 358/88 |
| 4,639,081 A | 1/1987 | O'Brien ...................... | 350/144 |
| 4,670,744 A | 6/1987 | Buzak ......................... | 340/716 |
| 4,834,512 A * | 5/1989 | Austin ......................... | 350/419 |
| 5,003,444 A | 3/1991 | Secka et al. ................. | 362/277 |
| 5,042,909 A | 8/1991 | Garcia, Jr. et al. .......... | 359/478 |
| 5,057,827 A | 10/1991 | Nobile et al. ................ | 340/755 |
| 5,067,167 A | 11/1991 | Berger ......................... | 382/46 |
| 5,082,350 A | 1/1992 | Garcia et al. ................ | 359/478 |
| 5,148,310 A | 9/1992 | Batchko ...................... | 359/479 |
| 5,161,054 A | 11/1992 | Williams, Jr. et al. ....... | 359/462 |
| 5,172,266 A | 12/1992 | Garcia et al. ................ | 359/478 |
| 5,257,086 A | 10/1993 | Fateley et al. ............... | 356/328 |
| 5,446,479 A * | 8/1995 | Thompson et al. ......... | 345/139 |
| 5,455,196 A | 10/1995 | Frazier ........................ | 437/187 |
| 5,479,185 A | 12/1995 | Biverot ........................ | 345/6 |
| 5,592,215 A | 1/1997 | Kuga ........................... | 348/51 |
| 5,627,554 A | 5/1997 | Jefferson .................... | 345/5 |
| 5,650,813 A | 7/1997 | Gilblom et al. ............. | 348/36 |
| 5,703,606 A | 12/1997 | Blundell ...................... | 345/22 |
| 5,754,147 A * | 5/1998 | Tsao et al. ................... | 345/6 |
| 5,801,666 A | 9/1998 | MacFarlane ................. | 345/6 |
| 5,867,152 A | 2/1999 | Sextro ......................... | 345/207 |
| 6,005,608 A | 12/1999 | Chakrabarti ................. | 348/46 |
| 6,052,100 A * | 4/2000 | Soltan et al. ................ | 345/6 |
| 6,329,963 B1 * | 12/2001 | Chiabrera et al. ........... | 345/6 |

* cited by examiner

*Primary Examiner*—Bipin Shalwala
*Assistant Examiner*—Prabodh Dharia
(74) *Attorney, Agent, or Firm*—Hovey Williams LLP

(57) ABSTRACT

A three-dimensional display apparatus (10) that can be used to display conventional pseudo three-dimensional images and true three dimensional images using a CRT screen (96), or an array of digital micromirror devices (152) or an array of activated micromirrors (174), or any other devices that can activate/deactivate multiple pixels, simultaneously, at a high speed.

15 Claims, 12 Drawing Sheets

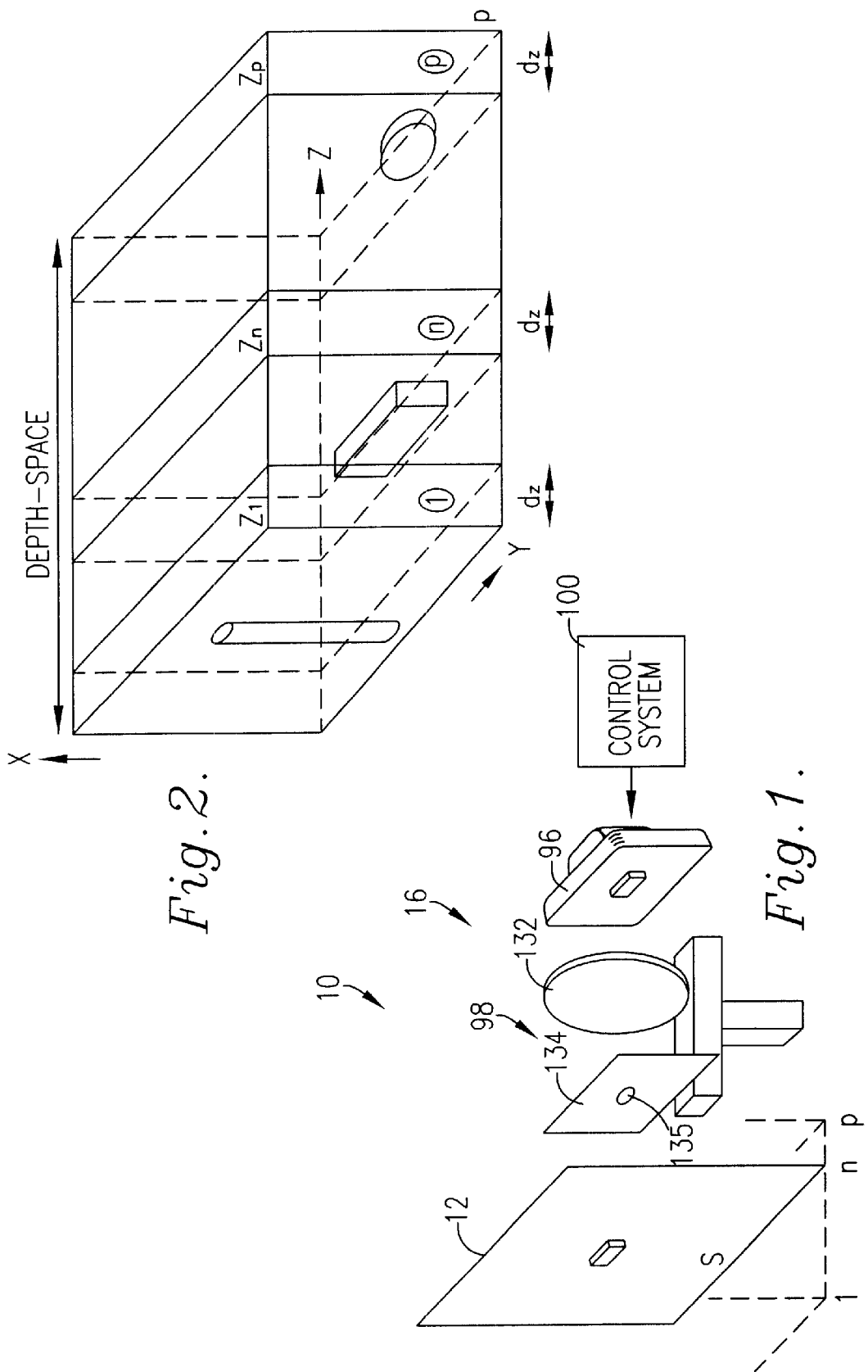

THREE-DIMENSIONAL DISPLAY APPARATUS

RELATED APPLICATIONS

This application claims the priority benefit of provisional application entitled Volditron: A Volumetric or True 3-D Information Display System, Ser. No. 60/136,834, filed Jun. 1, 1999, incorporated into the present application by reference.

BACKGROUND OF THE INVENTION

1. Field of the Invention

The present invention relates to three-dimensional display devices. More particularly, the invention relates to a three-dimensional display apparatus that can be used to display conventional pseudo three-dimensional images and true three-dimensional images using a CRT screen, an array of digital micromirror devices, an array of actuated micromirrors, or any other devices that can activate and deactivate multiple pixels simultaneously, at a high speed.

2. Description of the Prior Art

Three-dimensional displays are useful for many applications, including medical imaging, radar imaging, scientific visualizations, video games, and virtual reality computer programs. Many prior art devices have been proposed to display three-dimensional images; however, these prior art devices have proven to be either ineffective or too costly for the consumers of computer workstations.

For example, many prior art three-dimensional displays only create two-dimensional displays that merely simulate a three-dimensional display. Viewers wishing to see these three-dimensional displays must wear special glasses. Prior art three-dimensional displays that actually create three-dimensional images have been developed; however, these devices are typically too complicated and costly for most applications.

U.S. Pat. No. 6,005,608 (the '608 patent) discloses a three-dimensional display apparatus that effectively generates and displays true three-dimensional images. Moreover, the '608 patent apparatus is relatively inexpensive to manufacture and well suited for almost all applications requiring the display of three-dimensional images. However, the '608 apparatus suffers from several limitations that limit its utility. For example, although the apparatus is effective at displaying three-dimensional images when all the information for the images is separately distributed over a large number of planes of views, it cannot effectively display three-dimensional images when most of the information for the images is distributed over just a few planes of view. This is because the '608 patent apparatus uses a CRT display and a graphics driver to project three-dimensional images onto a moving screen, and all known graphics drivers are too slow to access all of the pixels of a CRT for a particular plane of view before the screen must be moved to a new plane of view. In addition, CRT's electron beam deflection mechanism imposes limitations on the number of lines that can be drawn in one second.

Another limitation of the '608 patent apparatus is that it can only display true three-dimensional images. This prevents the apparatus from being used with conventional three-dimensional graphics' software packages, which are designed to create only pseudo three-dimensional images on stationary screens.

OBJECTS AND SUMMARY OF THE INVENTION

The present invention solves the above-described problems and provides a distinct advance in the art of three-dimensional display devices. More particularly, the present invention provides a three-dimensional display apparatus that can effectively display three-dimensional images even when most of the information for the images is distributed over only a few planes of view. Alternatively, the apparatus of the present invention can display both conventional pseudo three-dimensional images and true three-dimensional images and can thus take advantage of conventional three-dimensional graphics software packages.

One embodiment of the apparatus of the present invention broadly includes: a screen; a screen moving assembly for moving the screen to a select number of different depth locations along a longitudinal axis defining a screen travel path; and an imaging assembly for displaying images on the screen as it is moved. The imaging assembly includes circuitry for receiving a 3D signal representative of a three-dimensional image and for separating the signal into a plurality of 2D signals each representative of a two-dimensional image within the three-dimensional image, and a plurality of image generators coupled with the circuitry by a plurality of channels for generating on the screen the two-dimensional images in a concurrent fashion as the screen is moved by the screen moving assembly.

In another embodiment of the present invention, the apparatus includes switching circuitry that permits a viewer to switch the apparatus between several display modes including a pseudo three-dimensional display mode and a true three-dimensional display mode. This permits the apparatus to be used with conventional three-dimensional graphics software packages.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a schematic diagram illustrating a display apparatus constructed in accordance with a first preferred embodiment of the present invention.

FIG. 2 is a schematic diagram showing a three-dimensional viewing region created by the display apparatus of FIG. 1 wherein several images in the viewing region are shown at different depth locations.

DETAILED DESCRIPTION OF THE PREFERRED EMBODIMENTS

Figure 12:
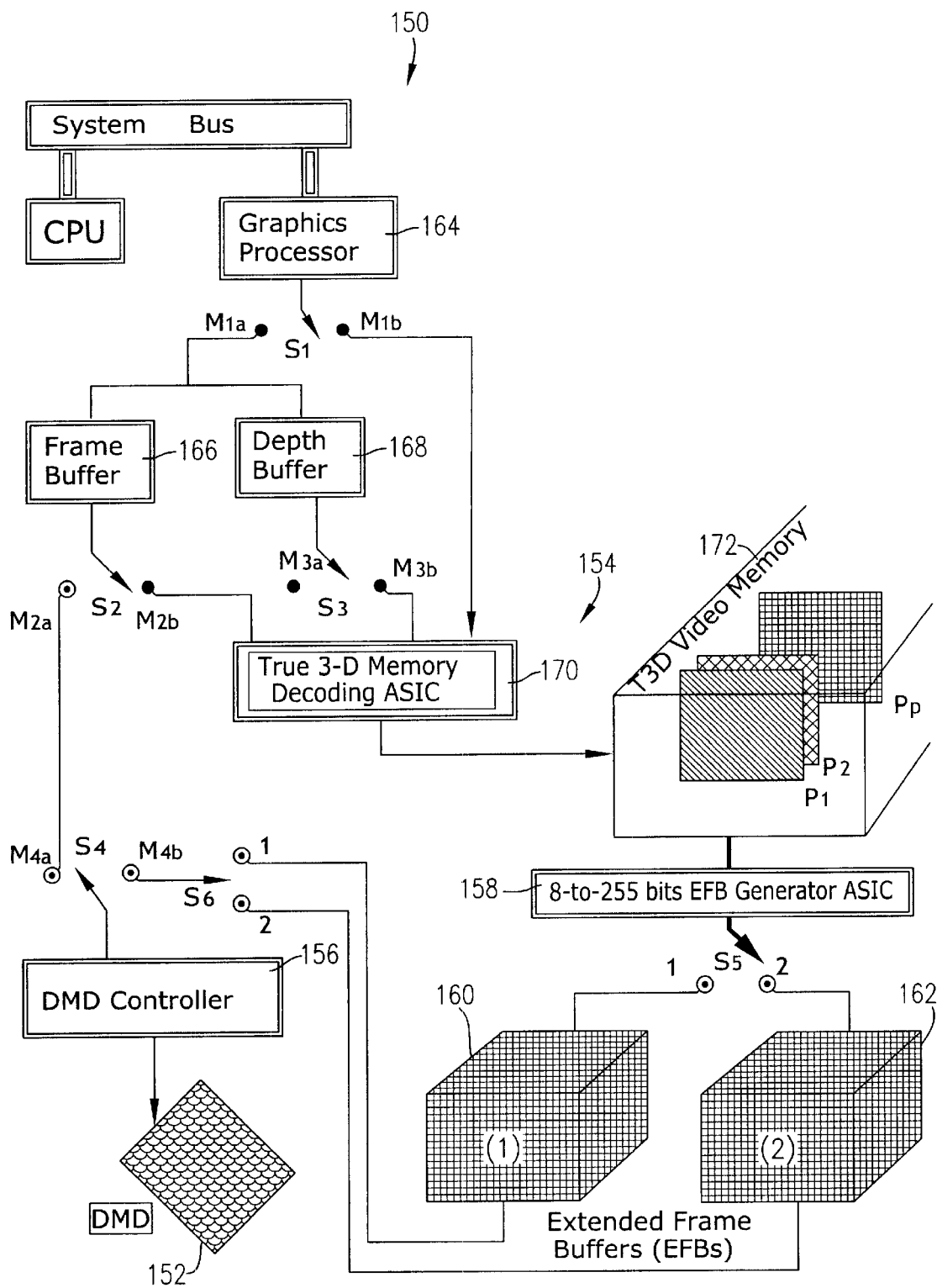
FIG. 12 is a schematic diagram illustrating a display apparatus constructed in accordance with a second preferred embodiment of the present invention.
Figure 13:
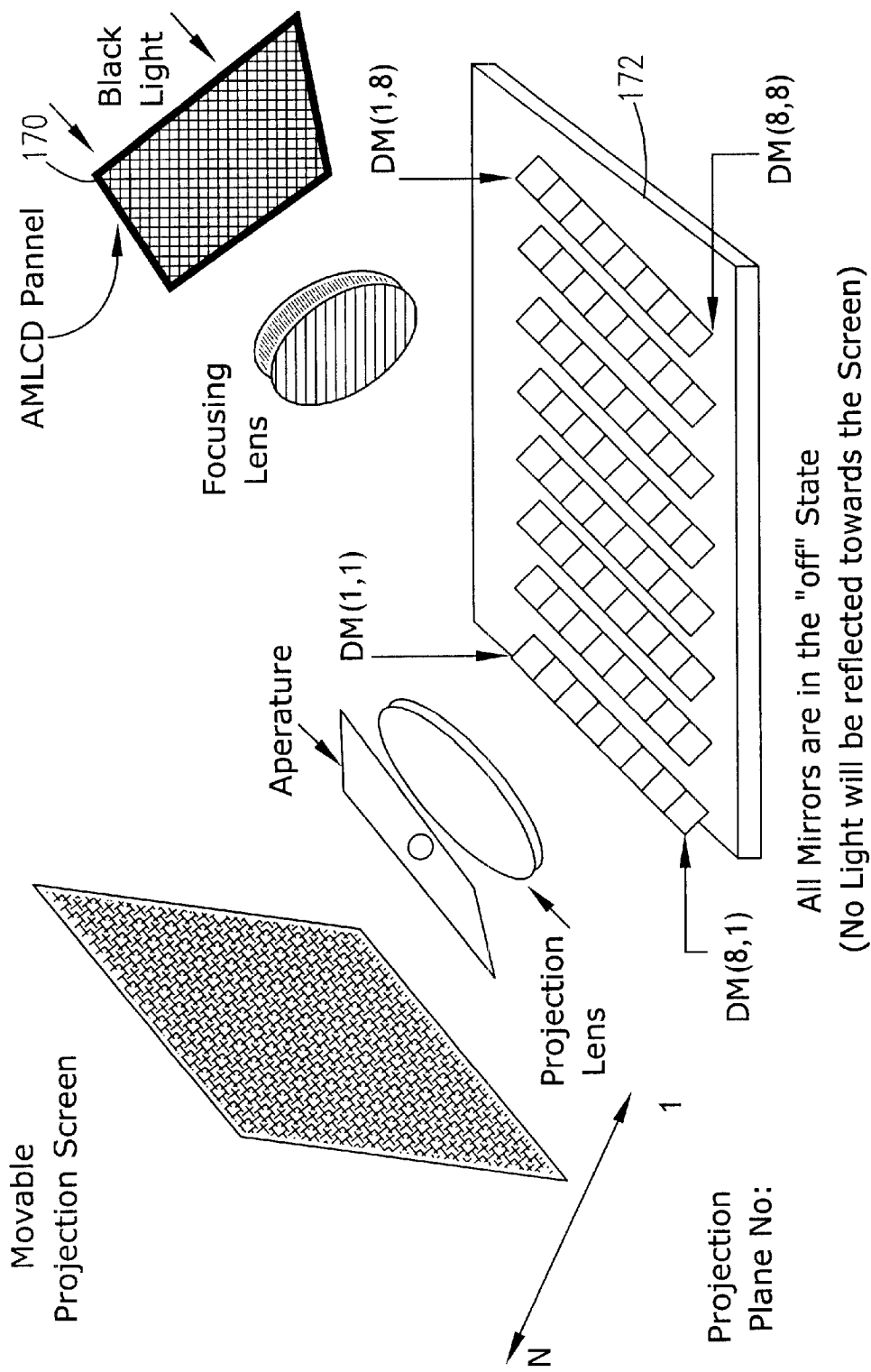
FIG. 13 is a schematic diagram illustrating modifications to the display apparatus of FIG. 12.
Figure 14:
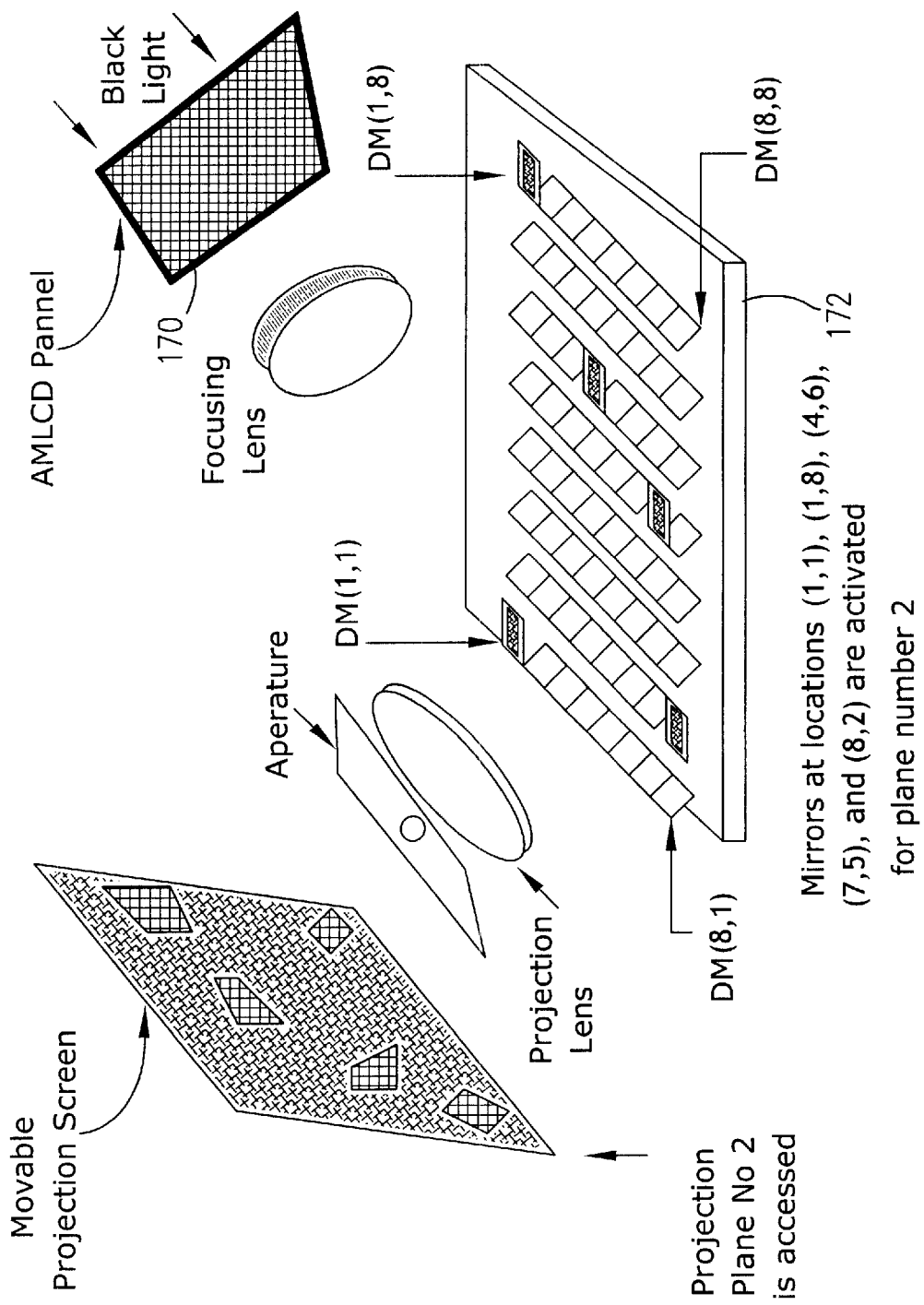
FIG. 14 is a schematic diagram illustrating modifications to the display apparatus of FIG. 12.
Figure 15:
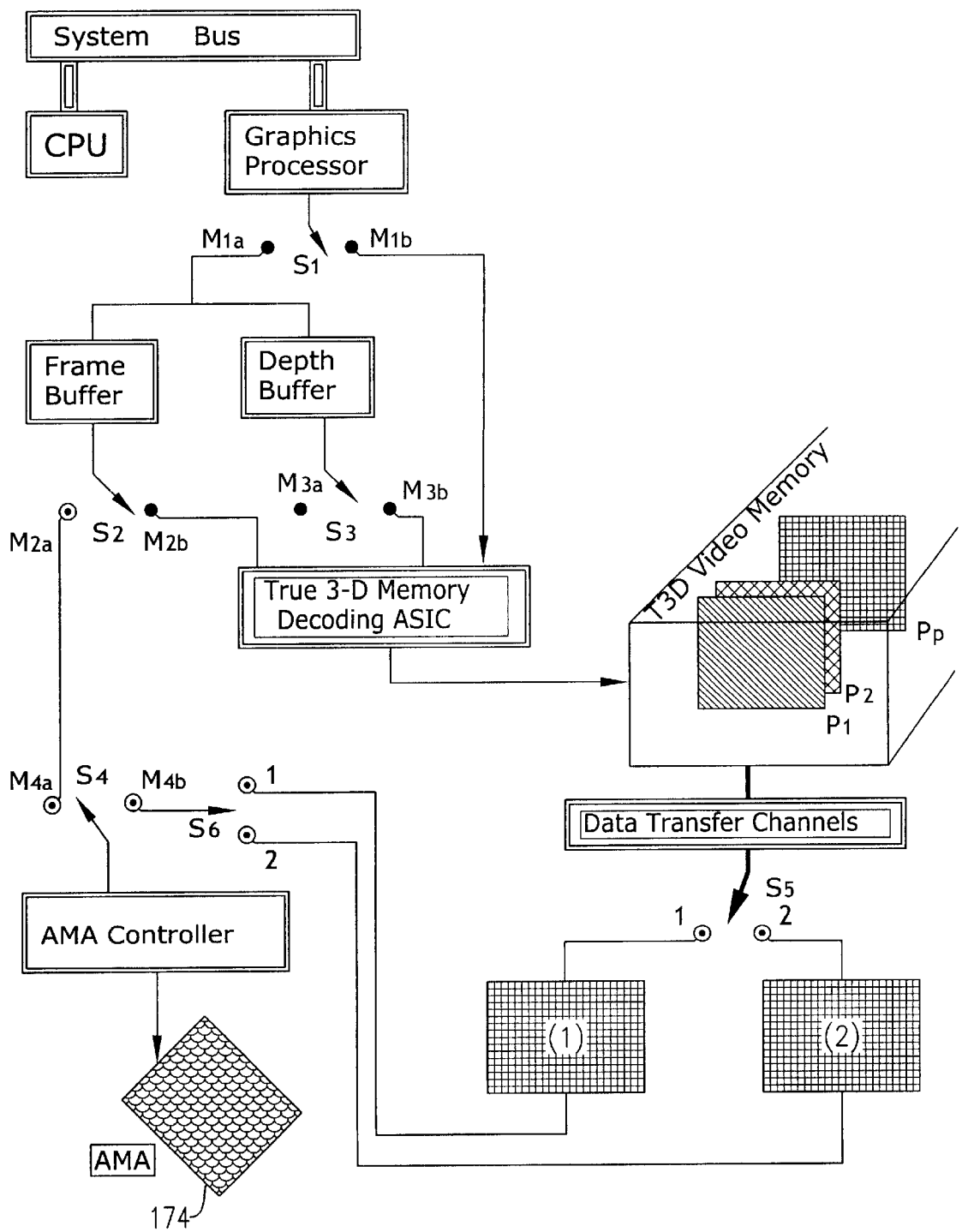
FIG. 15 is a schematic diagram illustrating a display apparatus constructed in accordance with a third preferred embodiment of the present invention.

The present invention includes three preferred embodiments of a three-dimensional display apparatus. The first preferred embodiment, which is illustrated in FIGS. 1–11, uses a CRT screen for generating and displaying three-dimensional images. The second preferred embodiment, which is illustrated in FIGS. 12–14, uses an array of digital micromirror devices to generate and display three-dimensional images. The third preferred embodiment, which is illustrated in FIG. 15, uses actuated micromirror devices to generate and display three-dimensional images. Each of these embodiments is discussed separately below.

CRT Embodiment

Figure 3:
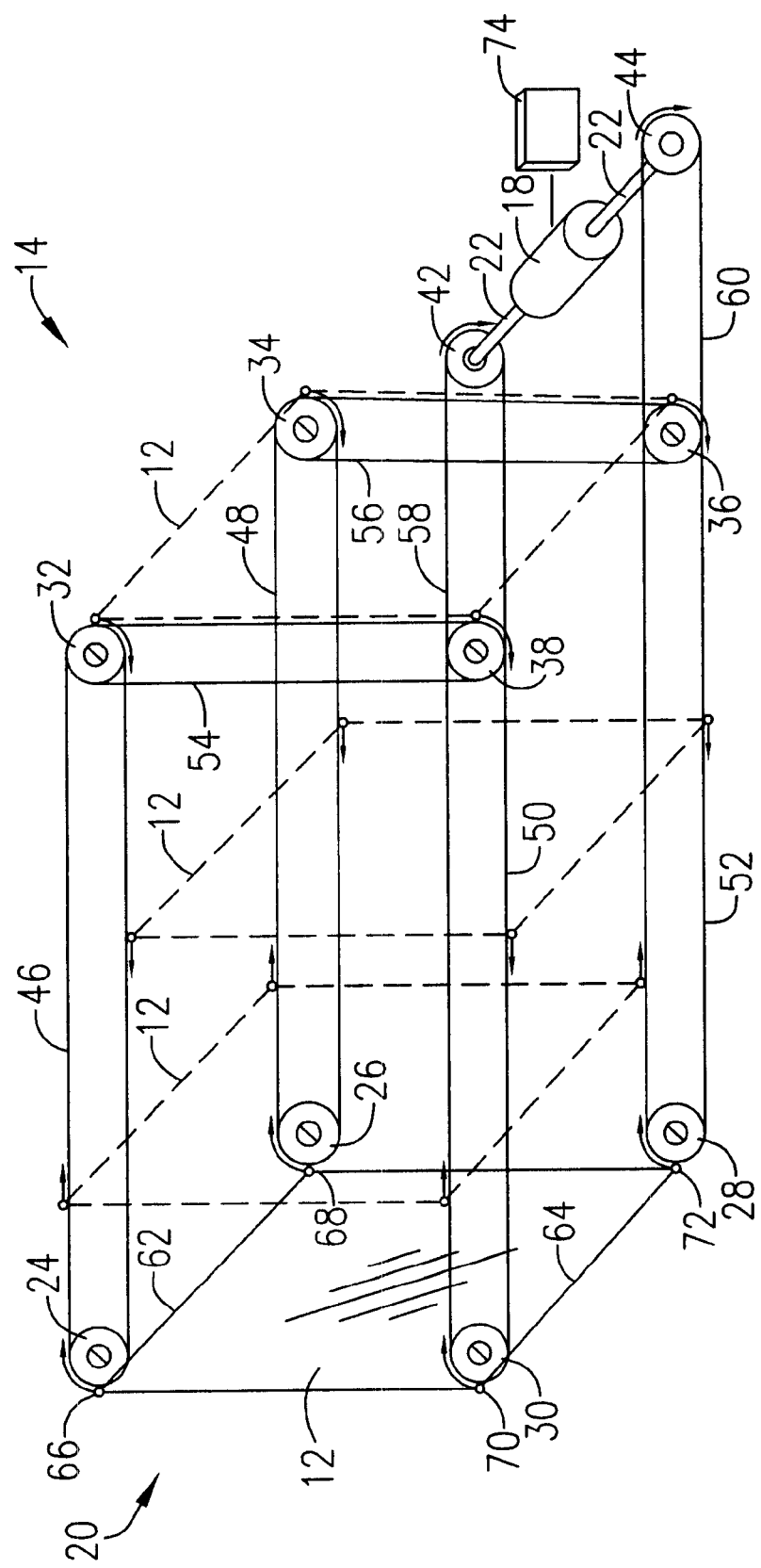
FIG. 3 is a schematic diagram of the screen and screen moving assembly of the display apparatus of FIG. 1.

A CRT-based embodiment of the three-dimensional display apparatus 10 is illustrated in FIGS. 1–11. Referring initially to FIGS. 1 and 3, the display apparatus 10 broadly includes a screen 12, a screen moving assembly 14 for moving the screen to a plurality of different depth locations, and an imaging assembly generally referred to by the numeral 16 for generating and displaying either true three-dimensional images on the screen 12 while the screen 12 is moved between its different depth locations or pseudo three-dimensional images while the screen is stationary.

The screen 12 may be a conventional cloth screen, a plane of liquid crystals that can be switched on or off, or any other conventional type of screen. The screen moving assembly 14 moves the screen 12 back and forth along the z-axis or depth space of a three-dimensional viewing region illustrated in FIG. 2. The z-axis of the viewing region is divided into "Z1"–"Zp" depth locations. The screen moving assembly 14 successively moves the screen 12 between each of these "Z1"–"Zp" depth locations as the imaging assembly 16 generates and displays images on the screen 12 as described in more detail below. The screen 12 and several preferred embodiments of the screen moving assembly 14 are described in detail in the above-referenced U.S. Pat. No. 6,005,608, hereby incorporated into the present application by reference.

The present invention generates true three-dimensional views by extending the configuration of a standard VGA-based display system that provides 640×480 pixels over a planar screen. Applicant has discovered that a depth space of at least 5 inches is needed to provide meaningful volumetric views. To provide volumetric views without aliasing, applicant has discovered that the distance between two consecutive planes of view should not be more than 0.5 mm. The three-dimensional viewing area in FIG. 2 therefore preferably includes 256 planes of view over a depth space of 5 inches.

One embodiment of the screen moving assembly 14 is illustrated in FIG. 3 and broadly includes a motor 18 and a pulley system 20 rotatably coupled with the motor. The motor preferably has a pair of rotating shafts 22. The pulley system 20 includes four spaced pulleys 24,26,28,30 positioned at the four corners of the "Z1" depth location of the screen 12 and four spaced pulleys 32,34,36,38 positioned at the four corners of the "Zp" depth location of the screen. Each pulley 26–38 is rotatably mounted to a support surface by a bearing assembly 40 as illustrated in FIG. 4.

The pulley system 20 also includes two additional pulleys 42,44 each attached to one of the rotating shafts 22 of the motor 18. The pulleys 24–38 and 40,42 are interconnected by a plurality of belts 46,48,50,52,54,56,58,60 so that the pulleys 24–38 and 40,42 jointly rotate with the shafts 22 of the motor 18.

The screen 12 is attached to the belts 46,48,50,52 so that it is moved back and forth along the z-axis of the viewing region as the pulleys 24–38 and 40, 42 are rotated by the motor. Specifically, the screen is attached to a pair of screen rods 62,64. The ends of the screen rod 62 are attached to bearings 66,68 that are coupled with belts 46,48. The ends of the screen rod 64 are attached to bearings 70,72 that are coupled with belts 50,52. The outer surface of each bearing 66–72 is fixed to its corresponding belt, and the inner surface of each bearing is connected to its corresponding rod. Thus, the screen 12 moves with the belts 46,48,50,52 between the depth locations "Z1"–"Zp" as the motor 18 rotates the pulleys 24–38. Specifically, the screen moving assembly 14 moves the screen 12 back and forth along the z-axis of the viewing region between the "Z1" location as depicted by the solid lines in FIG. 3 and the "Zp" location and several intermediate locations depicted by the dashed lines. An encoder 74 coupled with the motor 18 tracks the position of the screen.

Figure 4:
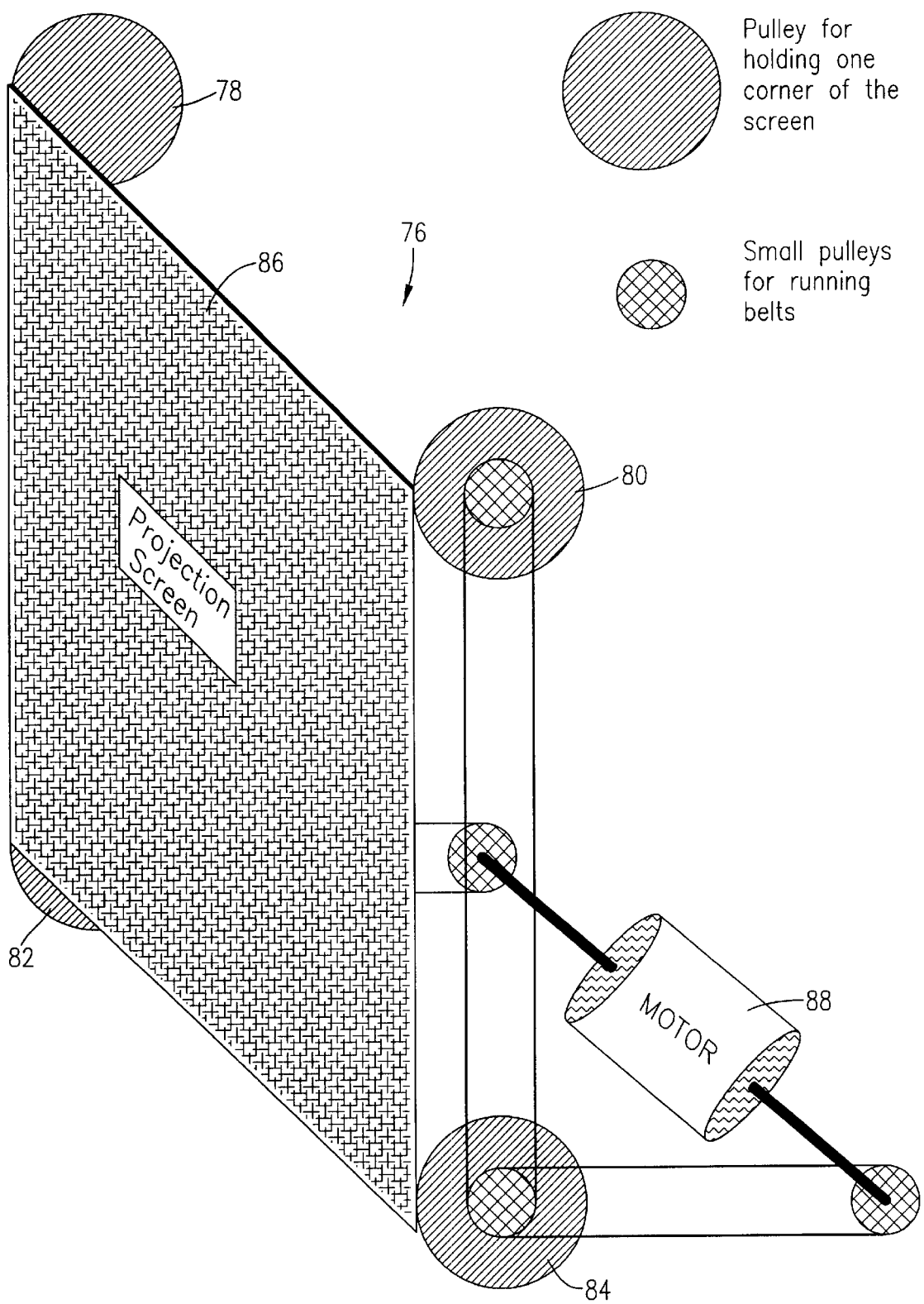
FIG. 4 is a schematic diagram of another embodiment of the screen moving assembly of the display apparatus of FIG. 1.
Figure 5:
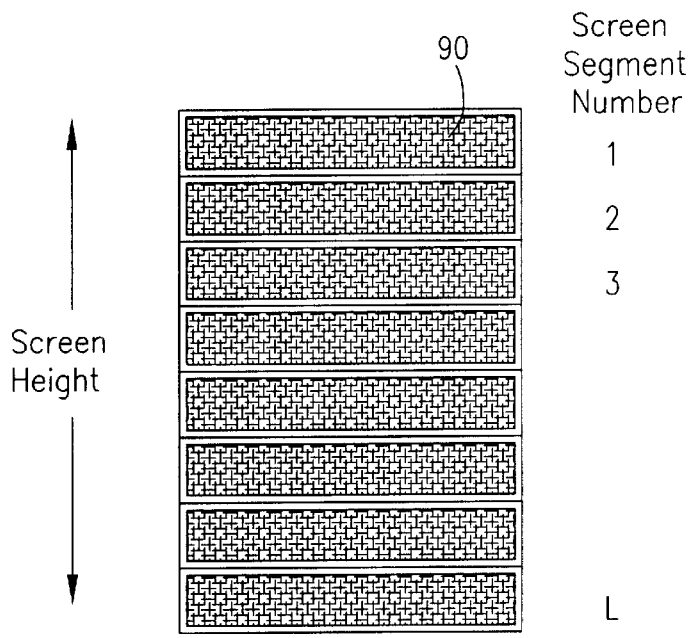
FIG. 5 is a schematic diagram of another embodiment of the screen of the display apparatus of FIG. 1.
Figure 6:
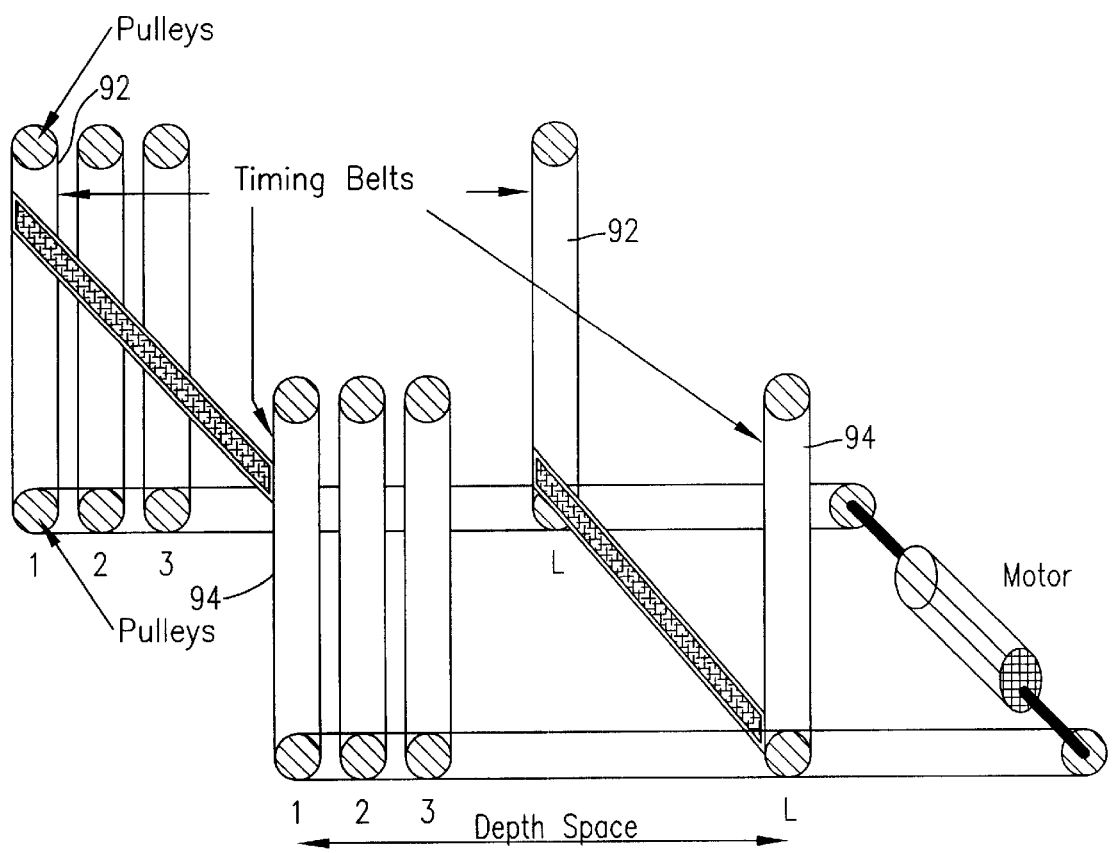
FIG. 6 is a schematic diagram of another embodiment of the screen moving assembly of the display apparatus of FIG. 1.
Figures 7, 8:
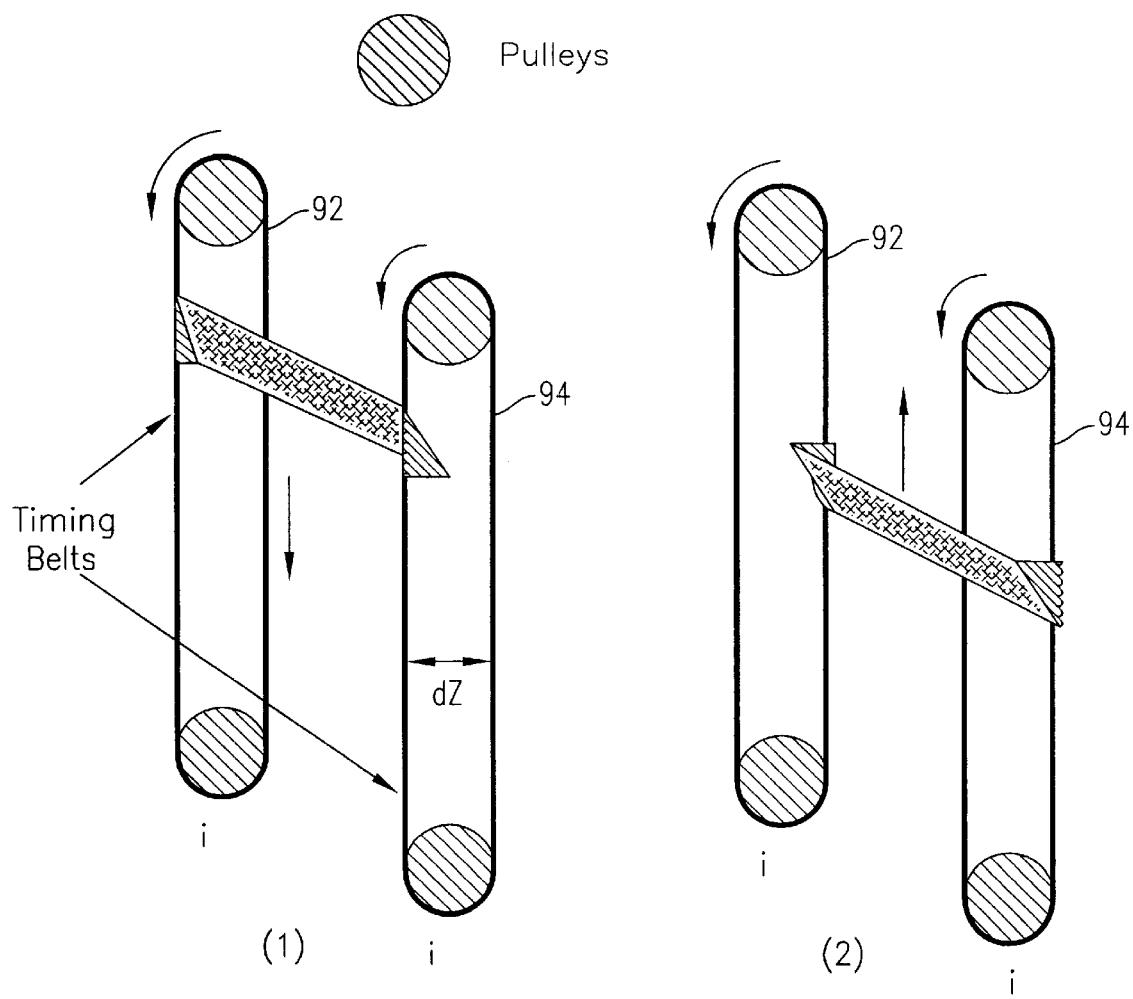
FIG. 7 is a schematic diagram illustrating movement of the screen with the screen moving assembly of FIG. 6.
FIG. 8 is a schematic diagram illustrating movement of the screen with the screen moving assembly of FIG. 6.

FIG. 4 illustrates an alternative embodiment of a screen moving assembly 76, which uses four bigger pulleys 78,80, 82,84, each of radius R. The four corners of a projection screen 86 are attached to these four pulleys as illustrated. In this embodiment, as a motor 88 rotates, the section of the screen that lies between the bottom of the upper pulleys and the top of the lower pulleys moves back and forth over a depth space of size 2R. During one complete rotation of the pulleys, the screen traverses the display volume twice. Thus, to access all the planes of view 60 times per second, the pulleys would have to rotate at a speed of 30 revolutions per second or 1800 RPM. By rotating the pulleys at a speed of 1800 RPM and projecting images only when the projection screen moves from the front to the rear, every plane of view can be accessed at a rate of 30 times per second. In a moderately illuminated room, true three-dimensional views are obtained without flickers while accessing each plane of view 30 times per second. A greater depth space may be accessed by using larger pulleys, without changing the speed of the motor. This is a significant advantage over the design illustrated in FIG. 3 where several pulleys (24,26,28,30) need to be moved to construct a bigger depth space for true three-dimensional views. In addition, the motor has to run at a higher speed to access the bigger depth space within a fixed frame rate.

A volumetric space may also be accessed by dividing a large projection screen 90 into "L" segments and connecting each segment of the screen to a separate pair of belts 92,94 as shown in FIGS. 5–8. In this embodiment, as a screen segment makes one round-trip travel over two pulleys, it accesses all the picture elements that lie within the depth space equal to the diameter of the pulleys. The total size of the depth space that can be accessed is "L" times the depth space accessed by one screen. Due to the typical alignment of the screen, the width of each screen segment is preferred to be greater than the depth space that the segment needs to access. Since each belt of this configuration moves only a small segment of a large screen, the load on the belts are small. Thus, this embodiment allows the screens to be rotated at a higher speed. This screen segmentation scheme would be highly desirable for large screens such as the ones used in movie theaters.

The imaging assembly 16, which is best illustrated in FIG. 1, generates and projects either true three-dimensional images on the screen 12 while the screen 12 is moved between its different depth locations by the screen moving assembly 14 or pseudo three-dimensional images while the screen is stationary. In the true three-dimensional mode, the imaging assembly 16 generates and projects a different two-dimensional image on the moveable screen 12 each time the screen is moved to one of its various depth locations "Z1"–"Zp". The preferred imaging assembly includes a CRT 96 for generating images, a focusing system 98 for focusing the images from the CRT to the screen 12, and a control system 100 for controlling and synchronizing operation of the CRT with the screen moving assembly.

Figure 9:
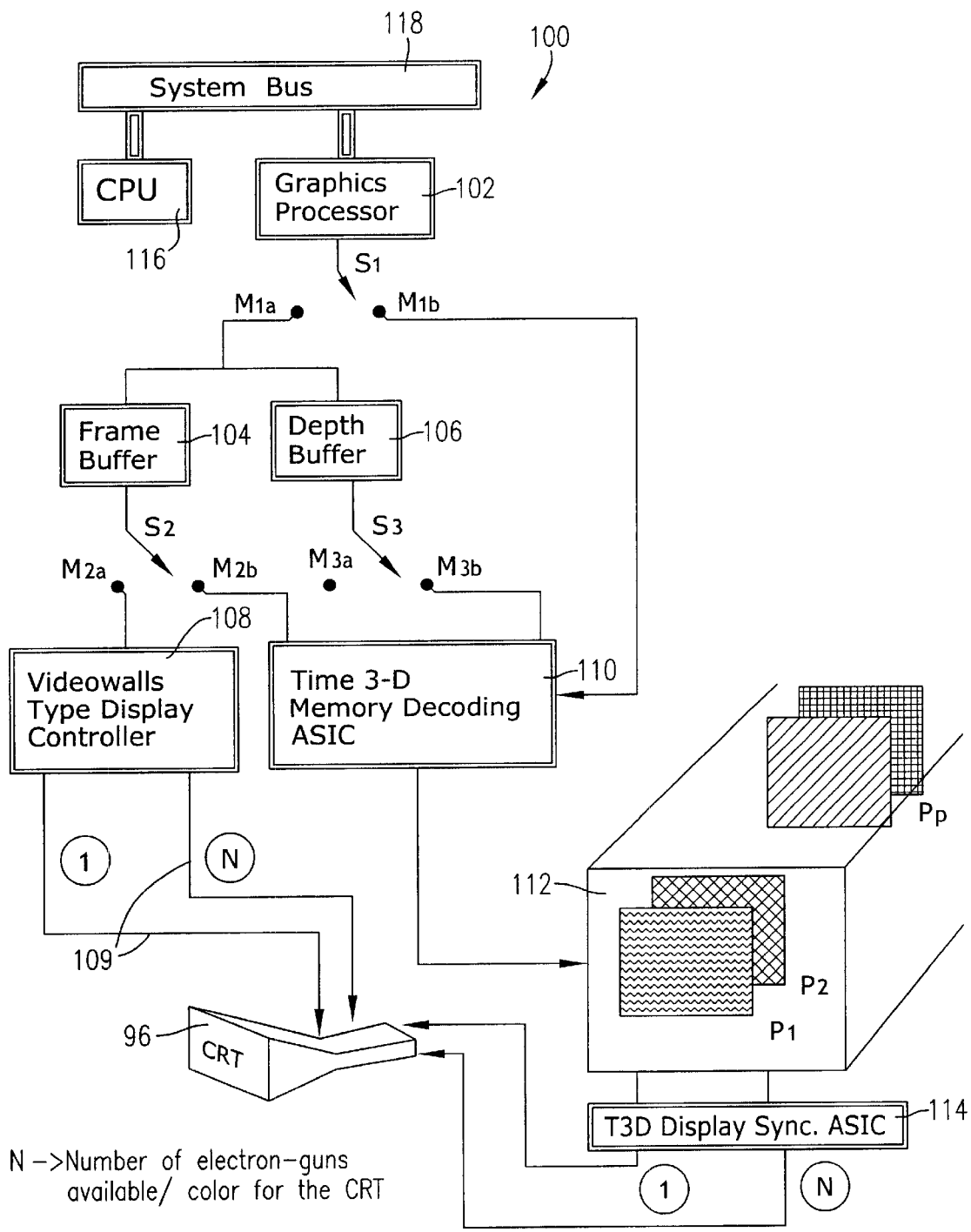
FIG. 9 is a block diagram of certain components of the display apparatus of FIG. 1.

One embodiment of the control system 100 is illustrated in FIG. 9 and includes a graphics processor 102, a frame buffer 104, a depth buffer 106, a Videowalls type display controller 108, a true three-dimensional memory decoding application specific integrated circuit (ASIC) 110, a plurality of three-dimensional display plane buffers (T3D video memory) 112, and a true three-dimensional display synchronization application specific integrated circuit (ASIC) 114.

The frame buffer 104 and the depth buffer 106 are coupled with the graphics processor 102 by a switch S1. Switch S1 also couples the ASIC 110 with the graphic processor. The controller 108 is coupled with the frame buffer 104 by a switch S2 and with the CRT 96 by "N" channels 109. Switch S2 also couples the frame buffer 104 with the ASIC 110. The depth buffer 104 is coupled with the ASIC 110 by a switch S3. The T3D video memory 112 is coupled with the ASIC 110 by a single channel and with the ASIC 114 by "N" channels.

The graphics processor 102 is coupled with a CPU 116 by a system bus 118 to receive three-dimensional image information therefrom. The graphics processor 102, which may be any conventional computing device, includes or can access memory for storing conventional three-dimensional graphics software.

The ASIC 110 receives signals representative of three-dimensional images when the display system is switched to a true 3-D mode as described below and separates the three-dimensional images into their component two-dimensional images. The ASIC allocates every picture element in a three-dimensional image as a pixel of one of the "P" display planes and stores the information for all of the display planes in the T3D video memory 112. The T3D video memory 112 stores "P" two-dimensional arrays in "P" display plane buffers.

Figure 10:
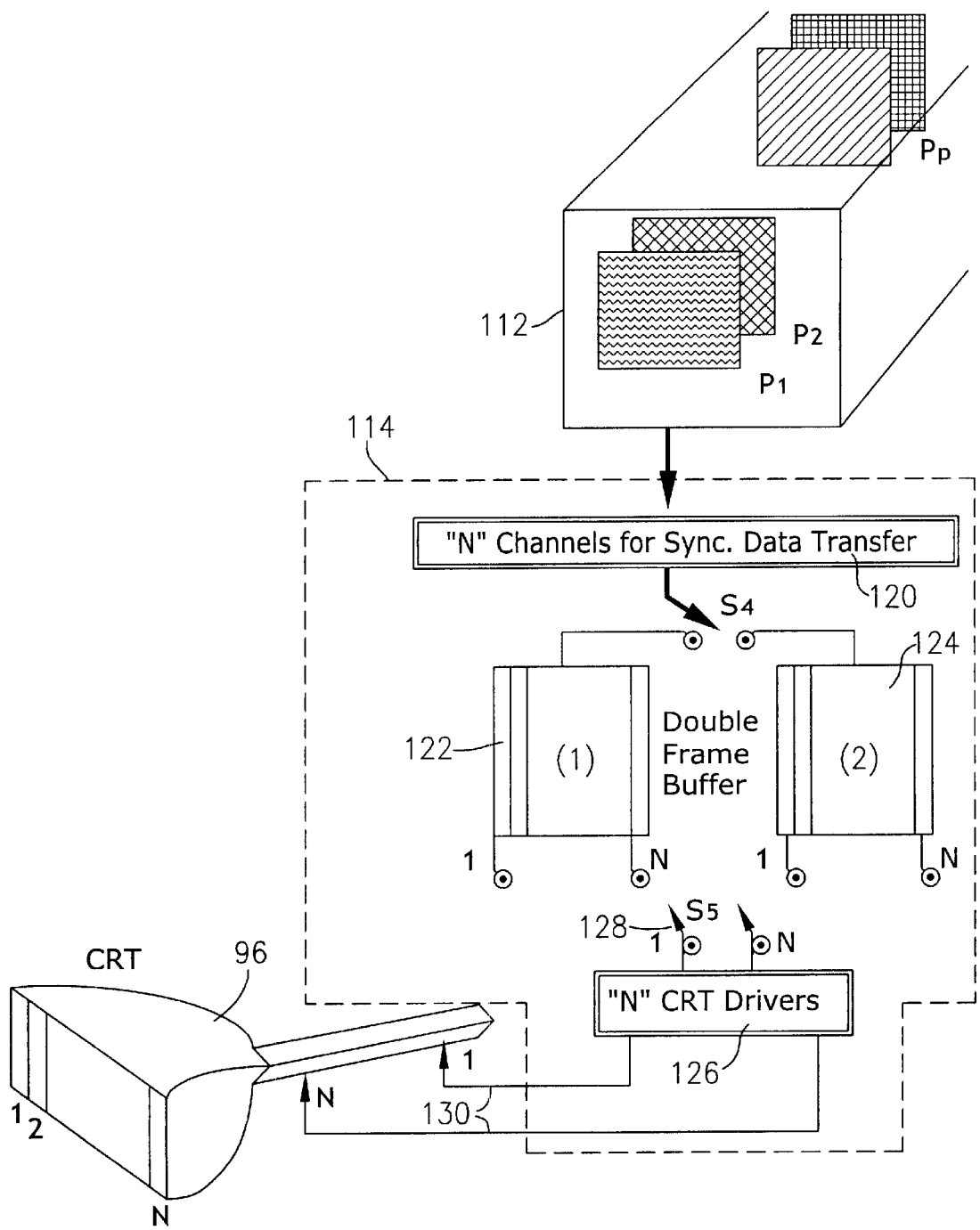
FIG. 10 is a block diagram illustrating several components from FIG. 9 in more detail.

The ASIC 114, which is illustrated in more detail in FIG. 10, includes "N" channels 120 synchronizing data transfer from the T3D video memory 112, a pair of frame buffers 122,124 connected to the "N" channel 120 by a switch S4, and "N" CRT drivers 126 coupled with the frame buffers by "N" channels 128. The "N" channels 128 are switched by a switch S5. The "N" CRT drivers 126 are coupled with the CRT 96 by "N" channels 130.

The control system 100 design takes into account several design parameters and assumptions. One assumption is that information is projected on the screen 12 only when the screen 12 moves from the front to the rear. To avoid flickering of images, all 256 planes of view are accessed within $\frac{1}{60}^{th}$ of a second, and the screen 12 moves back to the front plane-of-view within $\frac{1}{30}^{th}$ of a second. Thus, every plane of view can be accessed 30 times per second. Each plane of view is projected over a rectangular space of dimension 9"×12". Thus, the three-dimensional information is projected over a display volume of 9(H)×12(W)×5(D)= 540 cubic inches.

In order to store an entire frame of a true three-dimensional image, the size of the T3D video memory 112 needs to be:

640(pixels)×480(pixels)×256(planes)×3(colors) . 256 Mbytes

The T3D video memory 112 can be assumed to consist of 256 planes of memory per color where each plane of memory contains image information corresponding to one plane of view of one color. To achieve flicker-free true three-dimensional views, these 256 MBytes of information must be transferred to the CRT 96, over 3 concurrent lines (for color), within $\frac{1}{60}^{th}$ of a second. This requires a data transfer (DT) rate per color of:

$DT_{Rate/col}$=640×480×256×60=5.12 GBytes/sec

The T3D video memory 112 thus includes 256 planes of true three-dimensional video memory that corresponds to 256 planes of views of a true three-dimensional frame. Each such plane of memory consists of 640×480 bytes per color. This information will be transferred from the T3D video memory 112 to the frame buffers 122,124 using 32 concurrent channels 120. Since data from 256 planes of video memory must be transferred in $\frac{1}{60}^{th}$ of a second, data from each plane must be transferred within 1/(60*256) seconds or within 66 micro-secs. Each channel therefore requires a data transfer rate of 640×480/(32*66*10$^{-6}$) Bytes/sec or 160 MBytes/sec for each color. Such a data transfer rate, through each channel, can be easily achieved using existing technology.

Once the data transfer is completed from one plane of view of the T3D video memory 112 to one of the two frame buffers 122,124, the channels 128 can then be used to transfer this data from the frame buffer to the 32 different CRT drivers 126 within 66 micro-secs. In transferring information from a frame buffer 122,124 to the CRT drivers 126, each of the 32 channels operates with a bandwidth of 160 MHz. In addition, while the information is transferred from the frame buffer to the CRT drivers 126, information for the next plane of view can be transferred from the video memory 112 to the other frame buffer. This second frame buffer can be electrically connected to the CRT drivers 126 once the data transfer is completed from the first frame buffer to the CRTs 96. Thus, by switching between these two frame buffers after every 66 micro-secs, all the 256 planes of view can be accessed within $\frac{1}{60}^{th}$ of a second. In the configuration shown in FIG. 10, the switch S4 is used to select a frame buffer, and the switch S5 is used to connect the selected frame buffer to the CRT drivers 126.

A modern digital-to-analog converter (DAC) connected to the random access memory (RAM) of a frame buffer 122, 124 can operate at a 250 MHz clock frequency. These DACs are often referred to as RAMDACs. In order to achieve the desired data rate, more than 20 RAMDACs per color are needed to operate concurrently. For the convenience of using powers of two, assume the use of N=32 RAMDACs per color. Video data is transferred to these RAMDACs concurrently. These 32×3=96 RAMDACs are embedded in the "N" CRT driver 126.

In order to fully utilize the speedup in data transfer from the T3D video memory 112 to the RAMDACs of the drivers 126, these RAMDACs should be allowed to access 32 pixels per color, simultaneously. A conventional CRT, however, uses one electron gun per color, and it can access only one pixel per color in one clock cycle. Therefore, a single conventional CRT will not suffice.

To overcome the speed limitations of conventional CRTs, the apparatus of the present invention preferably uses N=32 small CRTs as depicted in FIG. 10, where one CRT and its associated driver are connected to one of the channels 128. In this configuration, each CRT needs to possess only 20×480 pixels per color. These 32 CRTs are preferably positioned side-by-side as illustrated in a fashion similar to that used in Videowalls-type display systems. In Videowalls systems, a large image of a conventional TV frame is obtained by dividing the actual image information into several segments, and then distributing these segments to several display drivers. Each display driver then magnifies its image before displaying it on the display unit. Once all these CRT drivers display their magnified images on their display units, the original image gets magnified. This leads to an increase in data transfer rate.

In the system of the present invention, the information content of a frame buffer 122,124 is divided over N=32 segments and distributed concurrently over N CRT drivers 126. Each display driver generates its image on a corresponding CRT without magnifying individual image segments. Assuming that all CRTs can be positioned side-by-side with negligible separation between their screens, each plane of view can be visualized without any blank lines. Existing technologies can use wire or planar cathodes to access more than one pixel per color of a CRT. The modern Field Emitter Technology actually uses one cathode behind every pixel. Therefore, the CRT of the present invention preferably consists of several electron guns per color instead of using 32 color CRTs. These electron guns are evenly distributed behind the visible surface of the CRT screen to make concurrent access of several color pixels of the CRT screen, for each plane of view of a true three-dimensional scene.

If all the 256 planes of view are accessed within $\frac{1}{60}^{th}$ of a second, each plane of view will be accessed within 66 micro-secs. The intensity of an activated pixel must therefore decay below the visible level within this time interval. This constraint must be satisfied to avoid blurring of the information between the consecutive planes. The pixels should possess a total response time, including rise time and fall time, of less than 66 micro-secs.

The focusing system 98, which is best illustrated in FIG. 1, projects and focuses the images created by the CRTs onto the screen 12 as the screen is moved between its various depth locations "Z1"–"Zp". Because the preferred display apparatus 10 has a depth space of 5", the focusing system must focus the images generated by the CRT on the screen 12 over a 5" depth space.

The preferred focusing system 98 includes a focusing lens 132 positioned in front of the CRT 96 and a focusing plate 134 having a small aperture 135 therein positioned between the lens and the screen 12. The CRT 96 and focusing system 98 are described in more detail in the U.S. Pat. No. 6,005,608.

The switches S1, S2, and S3 of the control system 100 allow the display apparatus 10 to be switched between a conventional pseudo 3-D display mode, a hybrid mode, and a true 3-D display mode. This permits the display apparatus 10 to display three-dimensional views not only from true three-dimensional data points, but also from the data points generated by conventional 3-D graphics programs. All three modes of operation are discussed below.

Mode-1: Conventional Pseudo 3-D Display Mode

In the conventional pseudo 3-D display mode, the graphics processor 102 uses the frame buffer 104 and the depth buffer 106 to eliminate hidden lines and surfaces. After this elimination process, the CRTs 96 project all the information of a 3-D scene into one plane. The intensity information of the pixels that are stored in the frame buffer 104 is used by the display controller 108 to turn on the pixels of the CRTs 96 with appropriate intensities. In this mode of operation the projection screen 12 remains stationary so that information is displayed similar to a conventional display system.

To provide this mode of operation, the switch S1 is connected to the node M1a, the switch S2 is connected to the node M2a, and the switch S3 is connected to the node M3a. This connects both the frame buffer 104 and the depth buffer 106 to the graphics processor 102. Conventional graphics software residing on the CPU 116 and its associated memory use these buffers to generate the intensity information of a conventional 3-D scene. At the end of processing one frame of information, the intensity information of every pixel of that scene is available in the frame buffer.

The frame buffer 104 is preferably divided into N=32 segments to correspond to the 32 CRT screens. On connecting the switch S2 to the M2a node, the controller 108 distributes these segments of information to their corresponding CRT screens 96 concurrently. The functional behavior of the display controller 108 could be somewhat similar to that of a Videowalls-type display controller. As a result, N=32 different CRT screens are accessible simultaneously to display a conventional planar view of a scene.

Mode-2: Hybrid 3-D Display

In the hybrid mode, true three-dimensional information is added to the conventional pseudo three-dimensional display mode. In this mode, the display apparatus 10 can extract true 3-D information of a scene from most of the conventional graphics/video software. As a result, visualization of information in true three-dimensional can be achieved using programs that are developed to generate pseudo 3-D information.

The switch S1 is connected to node M1a, the switch S2 is connected to node M2b, and the switch S3 is connected to node M3b. A memory element (m, n) of the depth buffer 106 is used to store the depth information $(z_{m,n})$ of the picture element that is projected on to the pixel at the location (m,n) on the display screen 12. The information of the depth buffer 106 is used to eliminate the hidden lines or surfaces for a fixed viewing direction. The corresponding (m,n)$^{th}$ element of the frame buffer 104 stores the intensity value $(I_{m,n})$ information of that pixel.

Once such a conventional 3-D frame is processed by a conventional 3-D graphics software, the contents of the frame and depth buffers 104,106 can be used to construct true 3-D information about that scene. This can be accomplished by putting the intensity $(I_{m,n})$ to the true 3-D video memory location (m,n) of the memory plane number Pz. Here Pz indicates the memory plane number corresponding to the depth value $Z_{m,n}$.

This configuration allows the true 3-D memory decoding ASIC 110 to use the content of the frame buffer 104 and depth buffer 106 for every pixel (m,n) of a conventional 3-D scene to construct true 3-D information about that scene. This is accomplished by storing the intensity information ($I_{m,n}$) of that pixel into the location (m,n) of the memory plane number Pz. Since the conventional graphics software draws 60 frames per second, the ASIC 110 needs to access nearly 300,000 (640×480) pixels per color within $\frac{1}{60}^{th}$ of a second. Thus, a frequency of 18 MHz per color would be sufficient to construct the true 3-D video memory for one 3-D frame of view.

After storing the intensity information of the pixels at the appropriate memory planes of the T3D video memory 112, the intensity information must be properly distributed over the desired volumetric space. This is accomplished in two steps. In the fist step, the information from the T3D video memory 112 is written in a plane-by-plane manner into one of the two frame buffers 122,124. In the next step, the image information from each of the 32 segments of the frame buffer 122 or 124, as discussed above in the description of Mode 1, is transferred concurrently to the corresponding CRTs 96. The display driver associated with each CRT must turn on its pixels with appropriate intensities. It is important to note that transferring image information from the T3D video memory 112 to a frame buffer 122,124, and then from that frame buffer to the 32 CRT drivers 126, has to be done in synchronization with the movement of the projection screen. This synchronization enables visualization of volumetric information of a scene.

Mode-3. The True Three-dimensional Display Mode

In this display mode, the location of a pixel in terms of its three spatial coordinated (m,n,z) and its intensity (I) will be provided directly to the true 3-D memory decoding ASIC 110 by the graphics processor 102. This is accomplished by connecting the switch S1 to the node M1b, which effectively deactivates the switches S2 and S3. The ASIC 110 then loads the intensity value of the pixel at the memory address (m,n) of the video memory plane Pz=z of the T3D video memory 112. Using this procedure, the T3D video memory 112 is accessed for a true three-dimensional frame of a true three-dimensional scene. Then, this plane-by-plane of intensity information of a true three-dimensional frame is transferred, using "N" channels 120, to one of the two frame buffers 122,124 as it is done in Mode-2.

After a frame buffer 122,124 is filled up with intensity information of a true 3-D frame, "N" different channels 128 transfer the contents of this frame buffer to "N" different CRT controllers 126. These controllers then generate information on their CRT screens 96 simultaneously, in synchronization with the movement of the projection screen 12 as mentioned in the previous section.

The operation of the display apparatus 10 in this mode is best understood with reference to FIG. 2, which illustrates an exemplary three-dimensional viewing region created by the display apparatus. The x-y plane of the viewing region represents the viewing plane of an observer, and the z-axis represents the depth of the viewing region. The viewing region is divided into "P" discrete locations of equal size along its z-axis. The depth "dz" of each "P" region is small enough so that the entire volume of the region can be considered as consisting of "P" two-dimensional viewing planes.

The display apparatus 10 moves the screen 12 back and forth in the viewing region along the z-axis to each of the "P" locations. Thus, the screen is initially moved from the "Z1" location to the "Zp" location and then back to the "Z1" location.

While the screen 12 is being moved, the imaging assembly 16 successively generates two-dimensional images on the CRTs 96 as described above and projects and focuses these images on the screen in synchronization with the movement of the screen so that each two-dimensional image is projected to its proper depth location. For example, when the screen 12 is moved to the position "Z1" illustrated in FIG. 2, the imaging assembly generates the two-dimensional image corresponding to this first plane of the three-dimensional image and projects this image onto the screen 12. Then, when the screen 12 is moved to the position "Z2", the imaging assembly generates and projects the image corresponding to the second plane onto the screen 12. These procedures are repeated for every plane in the viewing region at a rate rapid enough to enable a viewer to visualize a three-dimensional display of the images.

When all these 256 planes of view are projected properly over a volumetric space, true three-dimensional views of scenes are obtained. On accessing this volumetric space 30 or 60 times per second, flicker-free true three-dimensional views are generated. Such a scheme would be highly desirable when all the pixels with given intensities need to be generated. Wireframe-based true three-dimensional views for CAD/ CAM and scientific information are two important applicaitons. In addition, this particular approach can also be used in medical imaging, radar displays, and in teaching/learning complex physical and engineering processes.

In the third mode, plane-by-plane information is generated as the projection screen 12 moves from the front to the rear. In many occasions, however, a viewer might see information from the distant planes-of-views that is supposed to be hidden by the information from the front planes-of-views. In some cases it may be advantageous to have this see-through feature where the entire volume of information might be useful, as it might be the case for medical imaging, 3D CAD, radar displays, etc. However, in some cases it may not be desirable to visualize the information that is supposed to be hidden. To provide true horizontal and vertical parallax, views from different directions would provide different information by properly hiding the so called hidden lines or surfaces.

Figure 11:
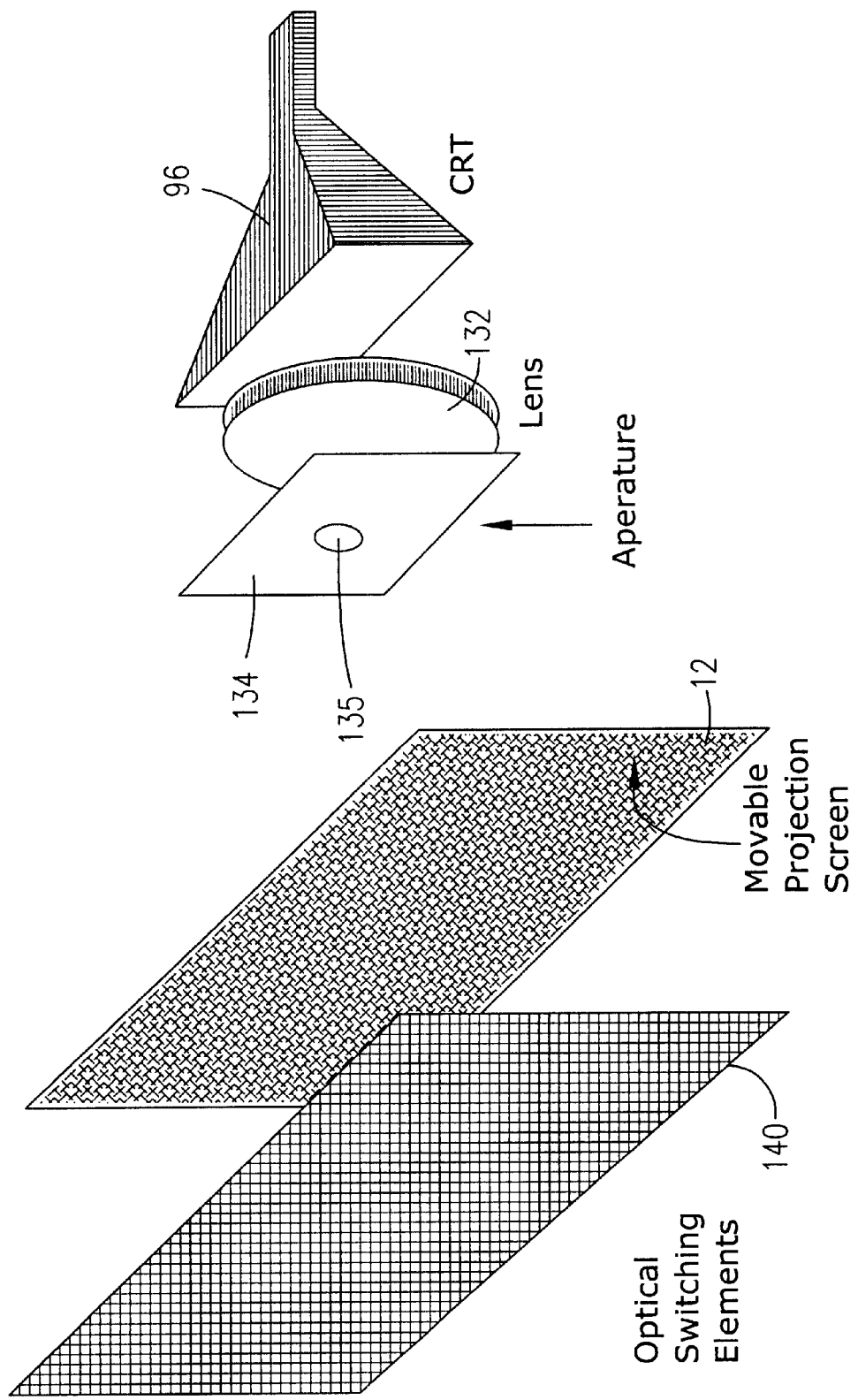
FIG. 11 is a schematic diagram illustrating the addition of optical switching elements to the display apparatus of FIG. 1.

This can be accomplished by attaching a two-dimensional planar array of optical switches 140 to the front surface of the display volume as shown in FIG. 11. Then, for every pixel that is drawn over the display volume, the angle between the normal to the surface represented by the pixel under consideration and the normal to each element of the optical switch located at the front plane of the display system is calculated. The angle between the pixel under consideration and optical switches can be pre-computed since their locations are fixed. An element of the optical switch 140 will be closed if this angle becomes greater than 90 degrees or if there exists an opaque object along the line drawn from the pixel location under consideration to that element of the optical switch. Such a technique eliminates the see-through feature.

Instead of using a planar array, a hemispherical structure can also be constructed using the optical switching elements to surround the display volume. Such a configuration might be desirable when multiple viewers are viewing a display volume, as it would be case for true three-dimensional TV, and true three-dimensional movies.

Digital Micromirror Embodiment

A display apparatus 150 constructed in accordance with a second preferred embodiment of the invention is illustrated in FIGS. 12–14. This embodiment uses digital micromirror devices (DMDs) 152 instead of CRTs to provide three-dimensional views. A DMD consists of a number of micromirrors equal to the number of pixels that needs to be generated for a display system. These micromirrors are laid down as an m×n array, corresponding to the m×n pixels of a display system. This entire array of micromirrors is illuminated by a powerful beam of light, and the orientation of each micromirror can be electronically controlled. The orientation of a micromirror is controlled to make it either reflect or not reflect the incident light in the direction of the projection screen. By controlling the overall duration of light reflection by a mirror, perceived intensity of a pixel can be easily varied over 256 levels of shade of a color. One such DMD is manufactured and sold by Texas Instruments.

The primary reason for considering DMDs in providing true three-dimensional views is that all the micromirrors of the DMD can be activated simultaneously, and the response time of the micromirrors is less than 20 micro-secs. The DMD-based true three-dimensional display system can also operate in the three different modes described above for the CRT-based display system.

A control system 154 for the DMD embodiment of the display system is illustrated in the block diagram of FIG. 12. The control system for the DMD embodiment of the display system is similar to the control system for the CRT-based display system except that a DMD controller 156 replaces the Videowalls controller and an extended frame buffer (EFB) generator ASIC 158 and a pair of extended frame buffers 160,162 replace the true three-dimensional display ASIC. The control system of the DMD embodiment includes a graphic processor 164, a frame buffer 166, a depth buffer 168, a true three-dimensional memory decoding ASIC 170, and a T3D video memory 172 that are similar to the components of the control system of the CRT embodiment of the invention.

As with the CRT-based embodiment, the DMD embodiment of the display system can be switched between a conventional pseudo 3-D display mode, a hybrid mode, and a true 3-D mode by switches 51, 52, 53, 54, 55, and 56.

Mode-1: Conventional Pseudo 3-D Display Mode

In this display mode, the switch S1 is connected to the node M1a, the switch S2 is connected to the node M2a, the switch S3 is connected to the node M3a, the switch S4 is connected to the node M4a, and switches S5 and S6 are not used. As a result, the graphics processor 164 is able to access the frame buffer 166 and the depth buffer 168. Conventional 3-D graphics software can then be used to generate a frame of a three-dimensional scene and store the intensity information of every pixel of that scene into the frame buffer 166. The DMD controller 156, which can access the frame buffer 166, is capable of operating both in the conventional 3-D display mode and true three-dimensional display mode. Therefore, on accessing the frame buffer 104, the DMD controller generates conventional pseudo 3-D views of a scene onto a stationary planar projection screen 12. In this mode of operation all conventional 3-D graphics/video utilities can be used for providing conventional pseudo 3-D views.

Mode-2: Hybrid

In this mode of operation, true three-dimensional views of a scene are generated from the information generated by a conventional 3-D graphics software. This mode requires:

(1) recovery of plane-by-plane information of a 3-D scene;

(2) for each plane-of-view, dynamic construction of one of the extended frame buffers; and (3) activation of the pixels of each plane-of-view with the desired intensity, in synchronization with the movement of the projection screen.

In a conventional pseudo 3-D display system, a memory element (x,y) of the depth buffer 168 is used to store the depth information ($Z_{x,y}$) of the picture element that is projected on to the pixel at the location (x,y). This information in the depth buffer is used to eliminate the hidden lines or surfaces for a fixed viewing direction. The corresponding (x,y) element of the frame buffer stores the intensity ($I_{x,y}$) information of that pixel. Then, for each pixel, the contents of the frame buffer and depth buffer can be combined to develop the true three-dimensional information content of that frame.

The present invention accomplishes this by putting the intensity value ($I_{x,y}$) to the T3D video memory location (x,y) of the memory plane number Pz. Here, Pz indicates the memory plane number corresponding to the depth value $Z_{x,y}$ of that pixel. For simplicity, assume that the entire depth space of a scene is divided over 256 depth planes, and the entire true three-dimensional video memory is also divided into 256 memory planes, i. e., Pz=z. As a result, one memory plane of the. T3D video memory 172 is available to store the intensity information of the pixels located in the corresponding depth plane.

The true three-dimensional memory decoding ASIC 170 processes the contents of the frame buffer ($I_{x,y}$) and depth buffer ($z_{x,y}$) for every pixel of a conventional three-dimensional scene. For a pixel located at (x,y) of the frame buffer, the ASIC stores the intensity information ($I_{x,y}$) into the location (x,y) of the memory plane number Pz=$Z_{x,y}$ of the true three-dimensional video memory.

The display preferably has 256 planes of views for a true three-dimensional frame, and, for each plane of view, a pixel can have any one of the 256 levels of intensity. The 8-to-255 bit Extended Frame Buffer (EFB) generator ASIC 158 enables the use of pulse width modulation (PWD) techniques to provide shade for a color. The ASIC processes one memory plane at a time of the true three-dimensional video memory, and generates 255 bits per pixel to represent the intensity of that pixel. In each of these 255 bits of information, only one bit will have a value "1" and all other bits will have zero values. The position of the bit with a value equal to "1" represents the intensity of the pixel as defined by the 8-bit content of the corresponding memory location, for the plane-of-view under consideration. For example, assume that a pixel at the location (x,y) of a plane-of-view possesses an intensity value "B." Upon converting 8-bit to 255-bit configuration, the bit at the position "B" of the 255-bit, of the location (x,y) of the EFB, will have a value "1." The rest of the 254-bits allocated for the location (x,y) of the EFB will have zero values.

The 8-to-255 bit converter ASIC 158 is able to concurrently access multiple memory locations of a memory plane of the T3D video memory 172. This concurrent access needs to be used so that one plane of information from the true three-dimensional video memory can be converted to the extended form within 66 micro-secs. For example, using a 200 Mhz clock, 32 channels of 8-to-255 bit converter per color would be needed to get the required speed of data conversion. 32 decoders per color may be used to fill up the EFB within the specified time interval. This processing speed of 66 micro-secs per plane-of-view enables the access of all the 256 planes of memory of a true three-dimensional frame in $\frac{1}{60}^{th}$ of a second.

Once an extended frame buffer 160,162 is filled up with the contents of one plane of T3D video memory 172, the DMD controller 156 starts to transfer the contents of the buffer to the excitation ports of the micromirrors 152. The DMD controller transfers all the bits from the position number 255, concurrently, to the input ports of the micromirrors. At the same time, it moves all the other bits, of all the locations, by one step towards the position number 255. A bit value "1" to the input port of a micromirror at the position (x,y) activates that micromirror to reflect light towards the projection screen. This reflected light generates a pixel on the projection screen. A "0" to the input of a micromirror does not activate the corresponding micromirror. Once a micromirror is activated, it continues to reflect light until a reset signal is sent by the DMD controller. This reset signal is used after transferring least significant bits (LSBs), i.e., the bits from the original position number "1," to the inputs of the micromirrors. After receiving the reset signal, all the micromirrors are deactivated simultaneously.

Because the mirrors receive bits starting with the most significant positions of the 255-bit register, the register that contains "1" at the higher position activates the corresponding micromirror for a longer period of time. Thus, the micromirror that is activated with the MSB=1 (or LSB=1) reflects light for the longest (shortest) duration, and that corresponds to the maximum (minimum) intensity represented by the DMD. Based on the content of the buffer, a micromirror takes 20 micro-secs to settle and then spends a maximum of 26 micro-secs to reflect light in the direction of the projection screen. After this 46 micro-secs, all the micromirrors are deactivated. Thus, 66 micro-secs are required for generating one plane of view, and approximately within 26 micro-secs, 255 pulses must be provided to transfer all the contents of the buffer to the input ports of the micromirrors. This configuration requires a clock frequency of $255*10^6/26$ Hz, or $\approx 10$ MHz. Thus, by generating a buffer, and clocking this buffer at a rate of 6 Mhz, the Pulse Width Modulation (PWD) of the reflected light can be achieved. The use of 255-bit per pixel in the buffer enables 256 levels of shade of a color, including the "off" state.

Once one buffer 160,162 is accessed by the DMD controller 156, the other buffer can be accessed by the 8-to-255 bit converter 158. In such a mode of operation, switches S5 and S6 operate concurrently. Only one buffer may be used, provided it allows simultaneous reading and writing facilities. It is also important to note that while the DMD controller 156 accesses one of the these buffers, the 8-to-256 bit converter ASIC 158 accesses the true three-dimensional video memory in synchronization with the back-and-forth movement of the projection screen. This synchronization is the key for generating plane-by-plane information so that a volumetric view of a scene can be obtained.

With this mode, true 3-D information of a scene can be extracted from most of the conventional graphics/ video software. As a result, the apparatus 154 enables the visualization of information in true three-dimensional even using the programs that are developed to generate pseudo three-dimensional information. This mode of operation is useful for cases where every pixel of every plane of view is not needed to visualize meaningful 3-D information. Possible examples are general purpose three-dimensional computer graphics, video games, 3D TV, etc.

Mode-3: The True Three-dimensional Display Mode

In this mode of display, the (x,y,z) location of a pixel and its intensity (I) is provided directly to the true three-dimensional memory decoding ASIC 170 by the graphics processor 164. This is accomplished by connecting the switch S1 to the M1b node and switch S4 to the M4b node. This effectively deactivates the switches S2 and S3. The true three-dimensional memory decoding ASIC 170 loads the intensity value "I" of the pixel at the memory address (x,y) of the video memory plane Pz=z. Using this procedure, the T3D video memory 172 is presented with the intensity information of all the pixels of a true three-dimensional scene. Then, this plane-by-plane intensity information is transferred to one of the two extended frame buffers 160,162 using the procedure described in the previous section. After a buffer is filled up with intensity information of one plane-of-view of a true three-dimensional frame, the DMD controller 156 accesses this buffer in synchronization with the movement of the projection screen 12 as discussed above. Flicker-free true three-dimensional views are generated by accessing the volumetric space at a rate of at least 30 times per second. This configuration is extremely useful where all the pixels with given intensities need to be accessed, such as in medical imaging, CAD/CAM, wireframe-based three-dimensional representation of scientific information, radar displays, etc.

It is important to note that modern DMDs can provide more than 5000 ANSI lumens of illumination, and that is sufficient to project video information on a large projection screen. Therefore, assume that the current light output capability of the DMDs is adequate for projecting information over several smaller screens. However, the light output from the DMDs can be increased if necessary with any of the following schemes:

(1) increasing the illumination intensity for the micromirrors;

(2) increasing maximum activation time for the micromirrors per pane by sacrificing number of planes of views;

(3) using 2×2 or even 3×3 micromirrors per pixel per color to increase the total intensity of a pixel by 4 or 9 times by activating a micromirror over the same duration; or (4) coating the surfaces of the 3×3 micromirrors per pixel with materials that possess 9 different levels of light reflectance properties.

True three-dimensional views may also be generated by combining an Active Matrix Liquid Crystal Display (AMLCD) 170 device with a DMD 172 as illustrated in FIGS. 13 and 14. The image of a conventional three-dimensional frame is first generated on the AMLCD screen, and that information is focused on to the micromirrors of the DMD. This focusing is done in such a way that each pixel from AMLCD is focused only on to the corresponding micromirror of the DMD. Each micromirror of the DMD can then act as a switch for projecting a pixel in the direction of the movable projection screen. To achieve true three-dimensional views, the pixels should be projected at their appropriate depth locations within a display volume.

The depth locations of all the pixels of a conventional 3-D frame can be generated into a depth buffer by a conventional 3-D graphics software. The contents of the depth buffer can be used to activate the micromirrors. This activation needs to be done in synchronization with the movement of the projection screen, so that pixels can be projected at their appropriate depth locations. Assume that the image information of a conventional 3-D frame is generated on the AMLCD unit while the projection screen is moving from the rear to the front. At this time, all the micromirrors of the DMD are deactivated so that no pixels are projected on the screen. As soon as the projection screen starts to move from the front to the rear, a depth sensor or actuator senses the location of the screen and transfers that information to a DMD controller. The DMD driver then uses the contents of the depth buffer to activate only those micromirrors that represent pixels of a plane-of-view currently accessed by the moving projection screen. This process continues until the projection screen reaches the last plane-of-view.

An AMLCD 170 unit is selected to generate the image information because it can maintain its image with proper intensity during the time the projection screen moves from the front to the rear. The frame and depth buffers may be updated during the turn around time of the projection screen. This arrangement enables the generation of images within the display volume while the projection screen is moving in either direction.

In order to explain the proposed mechanism for activating the micromirrors of the DMD to project pixels at their appropriate depth locations, assume that the AMLCD display unit consists of only 8×8 pixels. Each element of the depth buffer defines the depth location of a pixel, and the corresponding element of the frame buffer defines the intensity value, usually indirectly. Assume that the pixels (1,1), (1,8), (4,6), (7,5), (8,2) belong to the plane of view number 2.

When the projection screen reaches the location of the plane-of-view number 2, the register or counter (RC) that tracks the location of the projection screen will have a value equal to 2. 8×8 $N_B$-bit comparators, where "$N_B$" is the number of bits needed to define the depth locations, are used. Each comparator receives one set of inputs from the corresponding location of the depth buffer and another set of inputs from the register RC. Whenever there is a match at the inputs of a comparator, the output of the comparator gets activated, and that in turn activates a micromirror. As a result, the micromirrors (1,1), (1,8), (4,6), (7,5), (8,2) will be activated to reflect light in the direction of the projection screen as shown in FIG. 14.

The contents of the depth buffer can also be used to construct an Extended Depth Buffer (EDB) along the same line of constructing the previously described Extended Frame Buffer (EFB). After constructing the EDB with 255 bits of memory locations per pixel, all the bits corresponding to all the pixels should be moved concurrently towards the least significant bit locations at every clock cycle. Since the projection screen moves from the first plane of view to the last plane of view, the outputs from the least significant locations are used to activate the micromirrors. In this case if the pixel at (x,y) belongs to the plane number (z), then the $Z^{th}$ bit of the EDB register, located at (x,y) would have a value "1." The rest of the 254 bits of that register will have a zero value. In this mode of operation, when a value "1" is applied to the input of a micromirror, it reflects light from the corresponding pixel of the AMLCD device to the projection screen. A value "0" to the input of a micromirror deactivates that mirror, and the light from the corresponding AMLCD device will not be reflected towards the projection screen. Thus, each micromirror is activated for one clock cycle to project a pixel at its appropriate depth location, when that depth location is accessed by the moving projection screen. Since these 255 bits of EDB per pixel need to be delivered to the micromirrors within $\frac{1}{60}^{th}$ of a second, a clock frequency of (60*255) Hz, i.e., nearly equal to 15.5 Khz is adequate for moving these bits.

Actuated Micromirror Embodiment

A third preferred embodiment of the display system is illustrated in FIG. 15. This embodiment utilizes an actuated micromirror array to display three-dimensional images. In an actuated micromirror array (AMA) system, micromirrors are configured somewhat similar to the DMDs. The principal difference is that the micromirrors are activated using analog voltages that are proportional to the desired intensity values represented by the bytes of the video memory. The design of the AMA allows each micromirror to reflect light by an amount proportional to the analog input voltage. Since the micromirrors possess a response time of the order of 25 microseconds, it should be able to represent the information contents of one plane-of-view within the desired 66 microseconds. Thus, the AMA-based display system has the potential for being used as true three-dimensional display system.

Although the invention has been described with reference to the preferred embodiment illustrated in the attached drawing figures, it is noted that equivalents may be employed and substitutions made herein without departing from the scope of the invention as recited in the claims. For example, the specific values and numbers for examples and components described herein are disclosed for illustrating a preferred embodiment of the present invention and can be changed without departing from the scope of the invention.

Having thus described the preferred embodiment of the invention, what is claimed as new and desired to be protected by Letters Patent includes the following:

What is claimed is:

1. A three-dimensional display apparatus comprising:

a screen;

a screen moving assembly for moving the screen to a select number of different depth locations along a longitudinal axis defining a screen travel path; and an imaging assembly for displaying images on the screen as it is moved, the imaging assembly including circuitry for receiving a 3D signal representative of a three-dimensional image and for separating the signal into a plurality of 2D signals each representative of a two-dimensional image within the three-dimensional image, and a plurality of image generators coupled with the circuitry by a plurality of channels for generating on the screen the two-dimensional images in a concurrent fashion as the screen is moved by the screen moving assembly.

2. The display apparatus as set forth in claim 1, the plurality of image generators including a plurality of CRTs.

3. The display apparatus as set forth in claim 1, the circuitry including a circuit for separating the 3D signal into a plurality of 2D signals, a plurality of buffers coupled with the circuit for storing the 2D signals, and a plurality of drivers coupled with the buffers for driving the image generators in accordance with the 2D signals.

4. The display apparatus as set forth in claim 1, further including a focusing system coupled with the plurality of image generators for focusing the two-dimensional images form the plurality of image generators onto the screen as the screen is moved by the screen moving assembly.

5. The display apparatus as set forth in claim 1, the image generators including digital micromirror devices.

6. The display apparatus as set forth in claim 1, the image generators including actuated digital micromirror devices.

7. The display apparatus as set forth in claim 1, further including optical switching elements located adjacent the screen for eliminating hidden lines and surfaces from certain viewing angles.

8. A three-dimensional display apparatus comprising:

a screen;

a screen moving assembly for moving the screen to a select number of different depth locations along a longitudinal axis defining a screen travel path;

an imaging assembly for displaying images on the screen as it is moved; and switching circuitry for switching the imaging assembly amongst a pseudo three-dimensional display mode, a true three-dimensional display mode, and a hybrid display mode.

9. The display apparatus as set forth in claim 8, the imaging assembly including circuitry for receiving a 3D signal representative of a three-dimensional image and for separating the signal into a plurality of 2D signals each representative of a two-dimensional image within the three-dimensional image, and a plurality of image generators coupled with the circuitry by a plurality of channels for generating on the screen the two-dimensional images in a concurrent fashion as the screen is moved by the screen moving assembly.

10. The display apparatus as set forth in claim 9, the plurality of image generators including a plurality of CRTs.

11. The display apparatus as set forth in claim 9, the circuitry including a circuit for separating the 3D signal into a plurality of 2D signals, a plurality of buffers coupled with the circuit for storing the 2D signals, and a plurality of drivers coupled with the buffers for driving the image generators in accordance with the 2D signals.

12. The display apparatus as set forth in claim 9, further including a focusing system coupled with the plurality of image generators for focusing the two-dimensional images form the plurality of image generators onto the screen as the screen is moved by the screen moving assembly.

13. The display apparatus as set forth in claim 9, the image generators including digital micromirror devices.

14. The display apparatus as set forth in claim 9, the image generators including actuated digital micromirror devices.

15. The display apparatus as set forth in claim 8, further including optical switching elements located adjacent the screen for eliminating hidden lines and surfaces from certain viewing angles.

* * * * *